(12) United States Patent
Castano et al.

(10) Patent No.: US 6,623,096 B1
(45) Date of Patent: Sep. 23, 2003

(54) TECHNIQUES FOR MEASURING THE POSITION OF MARKS ON MEDIA AND FOR ALIGNING INKJET DEVICES

(75) Inventors: Jorge Castano, Barcelona (ES); Francesc Subirada, Barcelona (ES)

(73) Assignee: Hewlett-Packard Company, Palo Alto, CA (US)

( * ) Notice: Subject to any disclaimer, the term of this patent is extended or adjusted under 35 U.S.C. 154(b) by 87 days.

(21) Appl. No.: 09/627,509

(22) Filed: Jul. 28, 2000

(51) Int. Cl.[7] .................................................. B41J 2/01
(52) U.S. Cl. ......................................................... 347/19
(58) Field of Search ................................ 347/19, 37, 43

(56) References Cited

U.S. PATENT DOCUMENTS

| | | | |
|---|---|---|---|
| 4,187,511 A | 2/1980 | Robinson | 346/75 |
| 4,943,813 A | 7/1990 | Palmer et al. | 346/1.1 |
| 5,289,208 A | * 2/1994 | Haselby | 347/19 |
| 5,835,108 A | 11/1998 | Beauchamp et al. | 347/19 |
| 5,914,731 A | 6/1999 | Yano et al. | 347/9 |
| 6,007,181 A | 12/1999 | Takahashi | 347/41 |
| 6,015,201 A | 1/2000 | Asakura | 347/19 |
| 6,109,722 A | * 8/2000 | Underwood et al. | 347/19 |
| 6,161,914 A | * 12/2000 | Haselby | 347/19 |
| 6,435,654 B1 | * 8/2002 | Wang et al. | 347/43 |

* cited by examiner

Primary Examiner—Craig Hallacher

(57) ABSTRACT

An optical sensor for detecting the position of marks on a medium, wherein relative motion is provided between the optical sensor and the medium during an optical sensing operation. The optical sensor produces an electrical sensor signal, and has a field of view at the media in a direction of the relative movement. The marks have a nominal dimension in the direction of the relative movement, and the field of view is larger than the nominal dimension. This produces a sensor signal with a clear and relatively sharp peak in response to scanning the media mark.

A method of sensing directional aberrations among ink-jet nozzles of a plurality of printheads mounted on a scanning carriage is described, which includes printing an alignment pattern on a print medium, the alignment pattern comprising a set of target marks printed using a subset of the nozzles on each of the plurality of printheads, and a set of monochrome marks printed using a subset of the nozzles from only one of the printheads, each of the monochrome marks positioned in a nominal position with respect to a corresponding plurality of the target marks, and optically scanning the alignment pattern to determine measurements of relative positions between the monochrome marks and corresponding target marks. In one embodiment, the target marks include an elongated first mark disposed in a scan direction of scanning movement of the scanning carriage, and an elongated second mark disposed in a media moving direction transverse to the scan direction. In another embodiment, the target marks are patches of similar size to the monochrome marks.

37 Claims, 13 Drawing Sheets

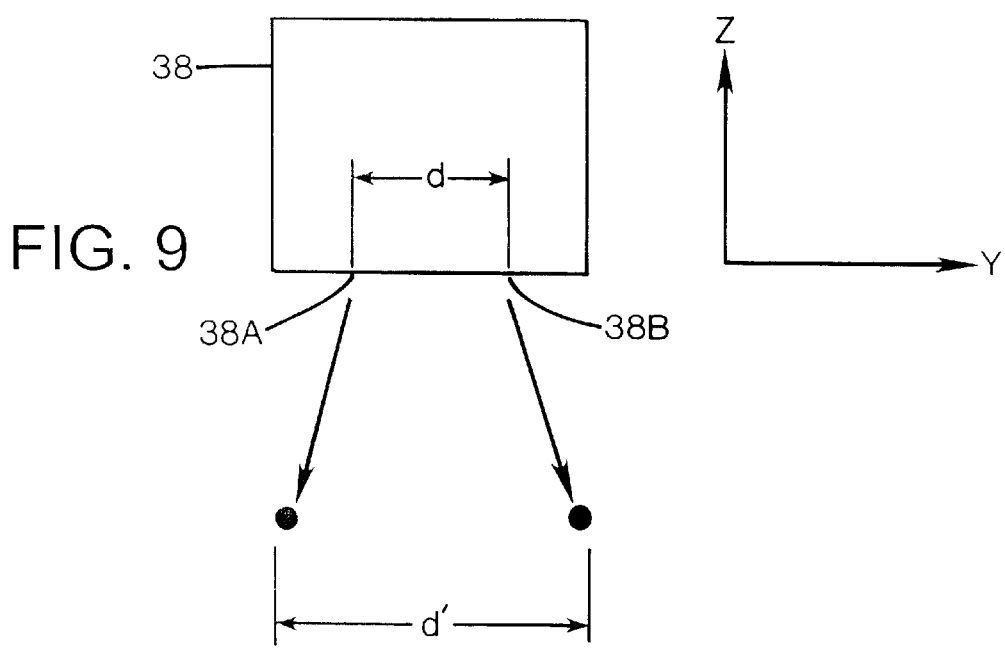

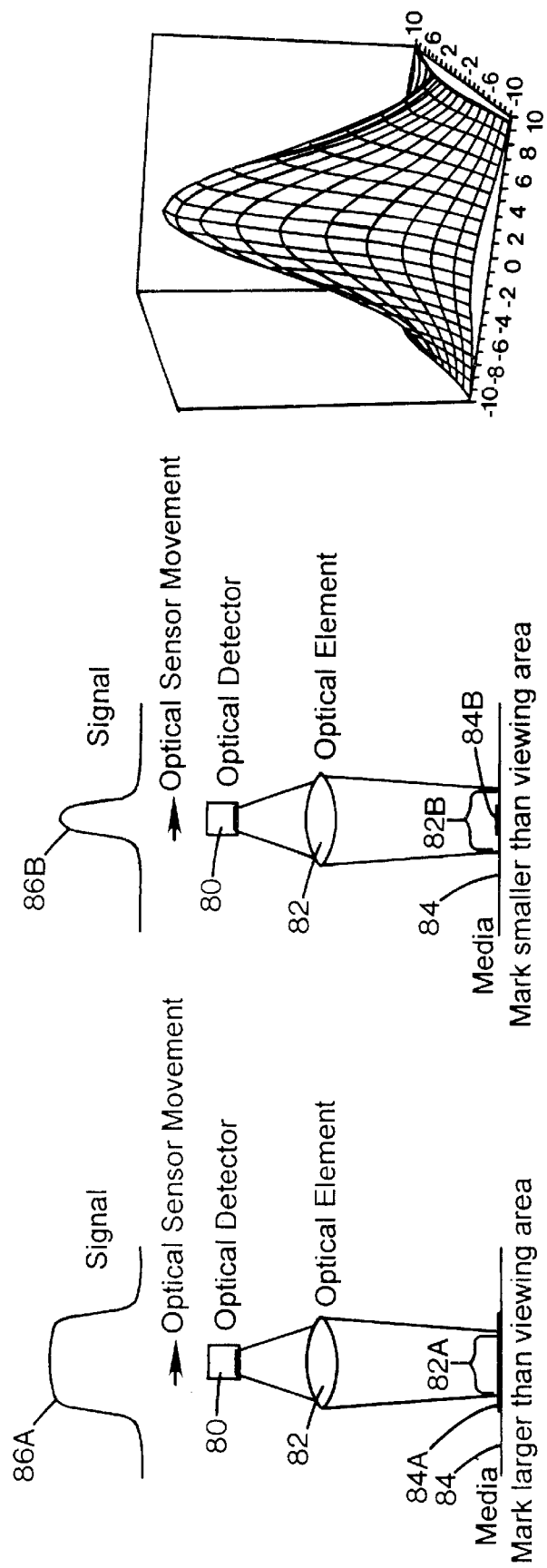

TECHNIQUES FOR MEASURING THE POSITION OF MARKS ON MEDIA AND FOR ALIGNING INKJET DEVICES

TECHNICAL FIELD OF THE INVENTION

This invention relates to methods for optically measuring the position of marks on print media.

BACKGROUND OF THE INVENTION

It is often necessary to detect and measure marks on media made with ink or any other marking system, using an optical sensor with only its light intensity response and spatial response of dimension zero (such as a radiometer or the like). With the freedom of movement in one or more axis, some spatial information (position) can be extracted from the media.

When an inkjet printer (small or large format) has more than one pen, errors can be produced from a variety of different origins. These errors include, for example, directional errors in the printheads which can produce errors in the paper and pen axes, i.e. the movement of the printhead (Odd/Even scan axis directionality (SAD) errors), and the movement of the media, paper axis directionality (PAD) and swath height errors (SHE). The PAD errors are measured in a direction orthogonal to the SAD error measurement. If the nozzles firing on a pen were perfectly directed, the height of the area printed by the height) should be equal to the height of the nozzles. If there are errors in the paper axis direction, the actual swath height is different from the nominal swath height. The difference is the swath height error (SHE).

Another type of error, when printing in bi-directional modes, is drop placement errors due to the firing signal timing ("Bidir" error). Drop placement errors can also be due to the printhead-to-printhead distance in both axes (Color to Color SAD and Color to Color PAD). When printing with different modes at different velocities, drop placement errors can occur due to the physics of the drop flight (Bidir). Within the pen, different directional errors from nozzle to nozzle creates error in the position of the dot on the paper (intra-pen SAD). Tolerances and variations of the mechanical parts of the printer can produce drop placement error when the pens are printing. One such error results from bowing developing on the penholder support rod or rail in a large format printer with a long swath distance. This error can provide different pen to paper spacing at different carriage positions.

To obtain high print quality, all of those errors need to be corrected. In the past, the way to do this was create some type of pattern for every defect, measure it and calculate the factor to apply to the electronics or firmware to correct the defect.

SUMMARY OF THE INVENTION

An optical sensor for detecting the position of marks on a medium is described, wherein relative motion is provided between the optical sensor and the medium during an optical sensing operation. The optical sensor produces an electrical sensor signal, and has a field of view at the media in a direction of the relative movement. In accordance with an aspect of the invention, the marks have a nominal dimension in the direction of the relative movement, and the field of view is larger than the nominal dimension. This produces a sensor signal with a clear and relatively sharp peak in response to scanning the media mark.

In accordance with another aspect of the invention, a method of sensing directional aberrations among ink-jet nozzles of a plurality of printheads mounted on a scanning carriage is described. The method comprises:

printing an alignment pattern on a print medium, the alignment pattern comprising a set of target marks printed using a subset of the nozzles on each of the plurality of printheads, and a set of monochrome marks printed using a subset of the nozzles from only one of the printheads, each of the monochrome marks positioned in a nominal position with respect to a corresponding plurality of the target marks; and optically scanning the alignment pattern to determine measurements of relative positions between the monochrome marks and corresponding target marks.

In one embodiment, the target marks include an elongated first mark disposed in a scan direction of scanning movement of the scanning carriage, and an elongated second mark disposed in a media moving direction transverse to the scan direction. In another embodiment, the target marks are patches of similar size to the monochrome marks.

Techniques are described for determining the position of the marks using a linear fitting algorithm.

BRIEF DESCRIPTION OF THE DRAWING

These and other features and advantages of the present invention will become more apparent from the following detailed description of exemplary embodiments thereof, as illustrated in the accompanying drawings, in which:

FIG. 9 diagrammatically illustrates SAD error.

FIGS. 10A and 10B illustrate an optical sensor moving in relation to a mark on a print medium. FIG. 10A illustrates the case in which the size of the mark is larger than the field of view of the sensor. FIG. 10B illustrates the case in which the size of the mark is smaller than the field of view in accordance with an aspect of the invention. FIG. 10C illustrates the spatial response of the sensor.

FIG. 12A illustrates the pens printing target patches using a center group of nozzles in each pen. FIGS. 12B and 12C illustrate the printing of color patches and target patches as printing proceeds on the pattern.

DETAILED DESCRIPTION OF THE PREFERRED EMBODIMENTS

A typical application for the invention is in a large format color inkjet printer/plotter. Commonly assigned U.S. Pat. No. 5,835,108, entitled CALIBRATION TECHNIQUE FOR MISDIRECTED INKJET PRINTHEAD NOZZLES, describes an exemplary system which can employ aspects of this invention. FIGS. 1–8 and the following description of these figures are generally taken from this patent, the entire contents of which are incorporated herein by this reference.

Figure 1:
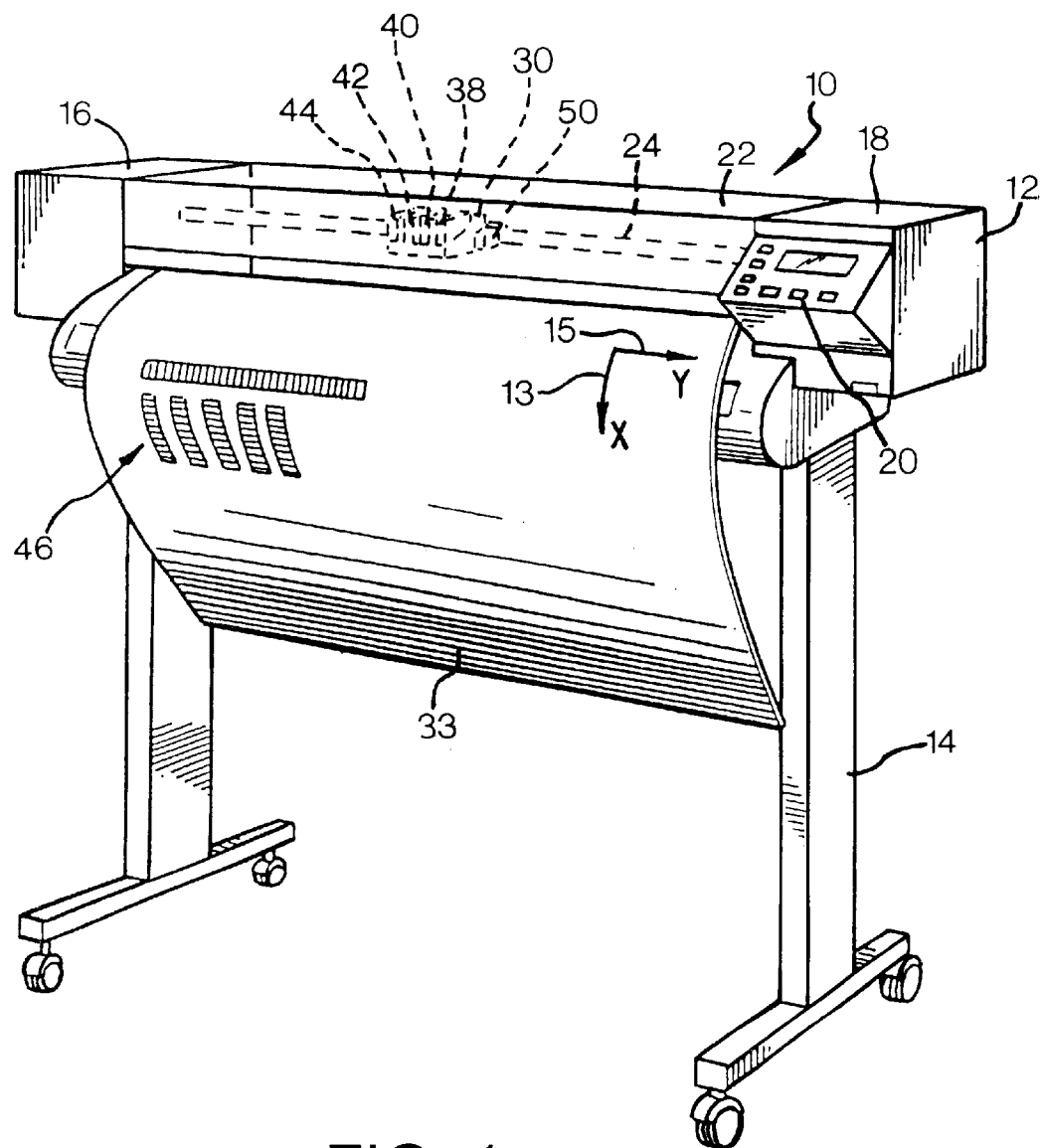
FIG. 1 is a perspective view of a large format inkjet printer/plotter incorporating the features of the present invention.

FIG. 1 is a perspective view of an inkjet printer/plotter 10 having a housing 12 mounted on a stand 14. The housing has left and right drive mechanism enclosures 16 and 18. A control panel 20 is mounted on the right enclosure 18. A carriage assembly 30, illustrated in phantom under a cover 22, is adapted for reciprocal motion along a carriage bar 24, also shown in phantom. The position of the carriage assembly 30 in a horizontal or carriage scan axis is determined by a carriage positioning mechanism 31 with respect to an encoder strip 32 (see FIG. 2). A print medium 33 such as paper is positioned along a vertical or media axis by a media axis drive mechanism (not shown). As used herein, the media axis is called the X axis denoted as 13, and the scan axis is called the Y axis denoted as 15.

Figure 2:
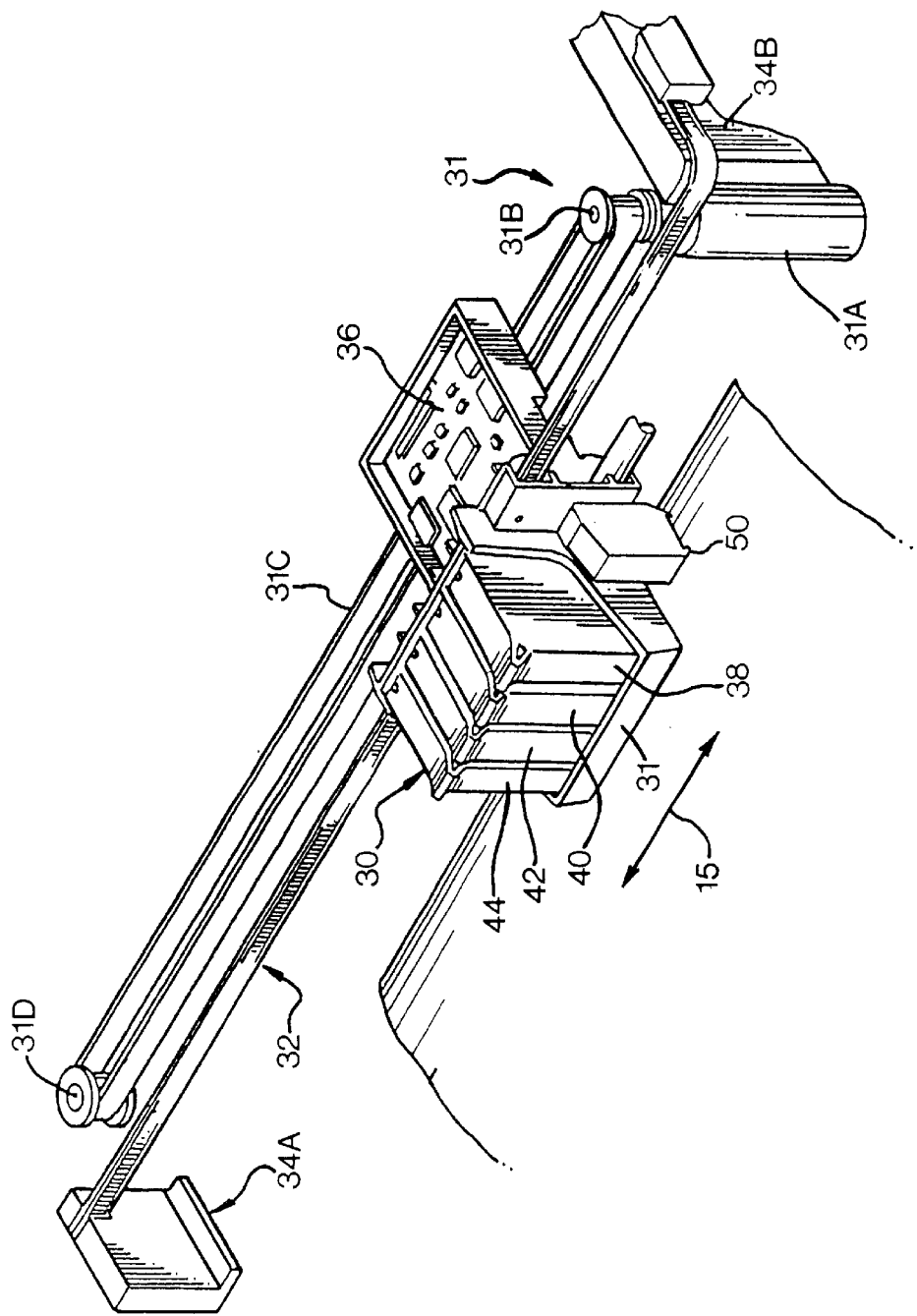
FIG. 2 is a close-up view of the carriage portion of the printer/plotter of FIG. 1 showing a carriage-mounted optical sensor.

FIG. 2 is a perspective view of the carriage assembly 30, the carriage positioning mechanism 31 and the encoder strip 32. The carriage positioning mechanism 31 includes a carriage position motor 31A which has a shaft 31B which drives a belt 31C which is secured by idler 31D and which is attached to the carriage 30.

The position of the carriage assembly in the scan axis is determined precisely by the encoder strip 32. The encoder strip 32 is secured by a first stanchion 34A on one end and a second stanchion 34B on the other end. An optical reader (not shown) is disposed on the carriage assembly and provides carriage position signals which are utilized by the invention to achieve image registration in the manner described below.

Figure 3:
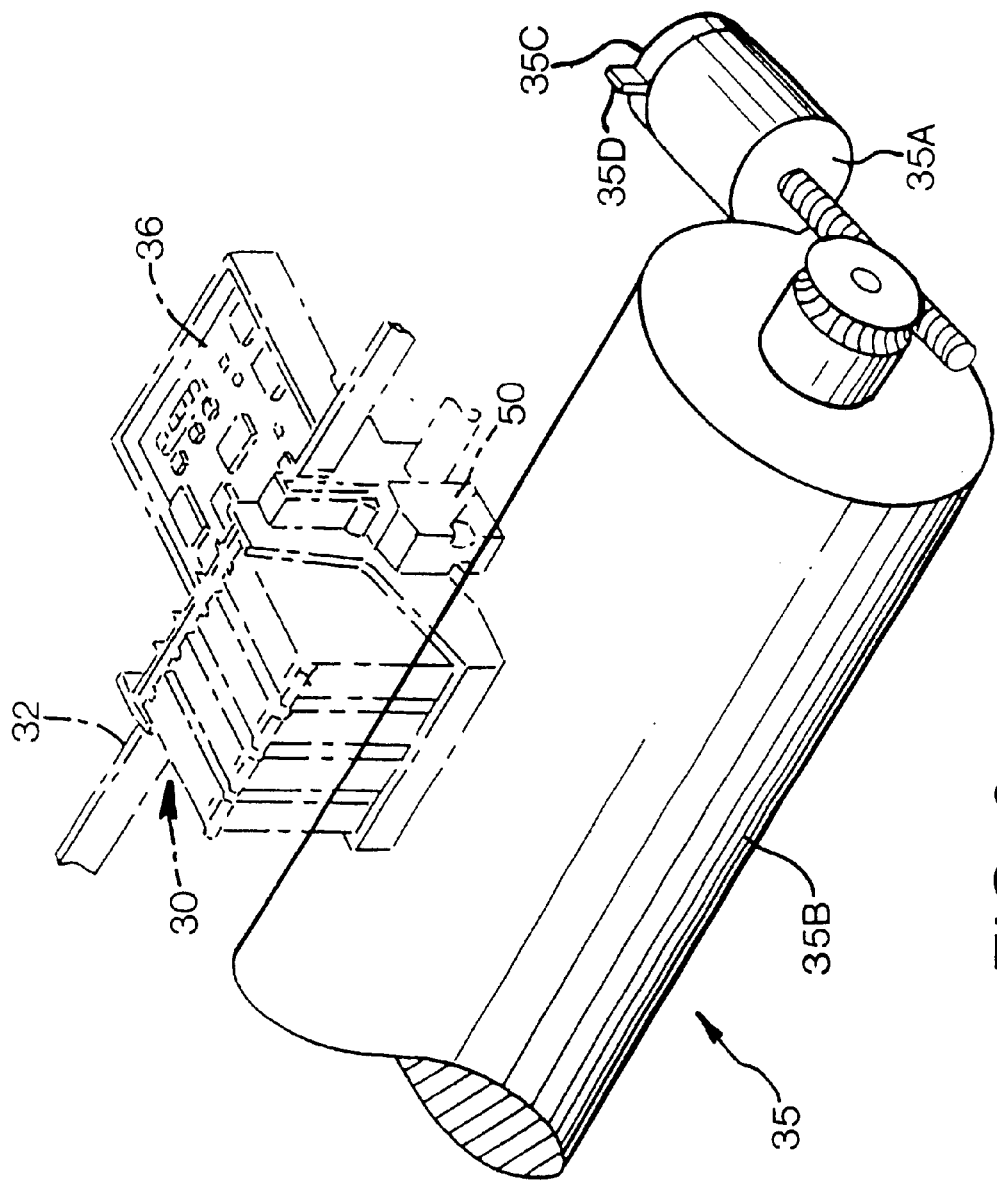
FIG. 3 is a close-up view of the platen portion of the printer/plotter of FIG. 1 showing the carriage portion in phantom lines.

FIG. 3 is a perspective view of a simplified representation of a media positioning system 35 which can be utilized in the inventive printer. The media positioning system 35 includes a motor 35A which is normal to and drives a media roller 35B. The position of the media roller 35B is determined by a media position encoder 35C on the motor. An optical reader 35D senses the position of the encoder 35C and provides a plurality of output pulses which indirectly determines the position of the roller 35B and, therefore, the position of the media 33 in the Y axis.

The media and carriage position information is provided to a processor on a circuit board 36 disposed on the carriage assembly 30 for use in connection with printhead alignment techniques of the present invention.

The printer 10 has four inkjet print cartridges 38, 40, 42, and 44 that store ink of different colors, e.g., black, magenta, cyan and yellow ink, respectively. As the carriage assembly 30 translates relative to the medium 33 along the X and Y axes, selected nozzles in the inkjet print cartridges are activated and ink is applied to the medium 33. The colors from the three color cartridges are mixed to obtain any other particular color. Sample lines 46 are typically printed on the media 33 prior to doing an actual printout in order to allow the optical sensor 50 to pass over and scan across the lines as part of the initial calibration.

The carriage assembly 30 positions the inkjet print cartridges and holds the circuitry required for interface to the ink firing circuits in the print cartridges. The carriage assembly 30 includes a carriage 31 adapted for reciprocal motion on front and rear slider rods.

As mentioned above, full color printing and plotting requires that the colors from the individual print cartridges be precisely applied to the media. This requires precise alignment of the print cartridges in the carriage. Unfortunately, paper slippage, paper skew, and mechanical misalignment of the print cartridge results in offsets in the X direction (in the media advance axis) and the Y direction (in the carriage or axis) as well as angular theta offsets. This misalignment causes misregistration of the print images/graphics formed by the individual ink drops in the media. This is generally unacceptable as multi-color printing can typically require image registration accuracy from each of the printheads to within $\frac{1}{2400}$ inch.

Figure 4:
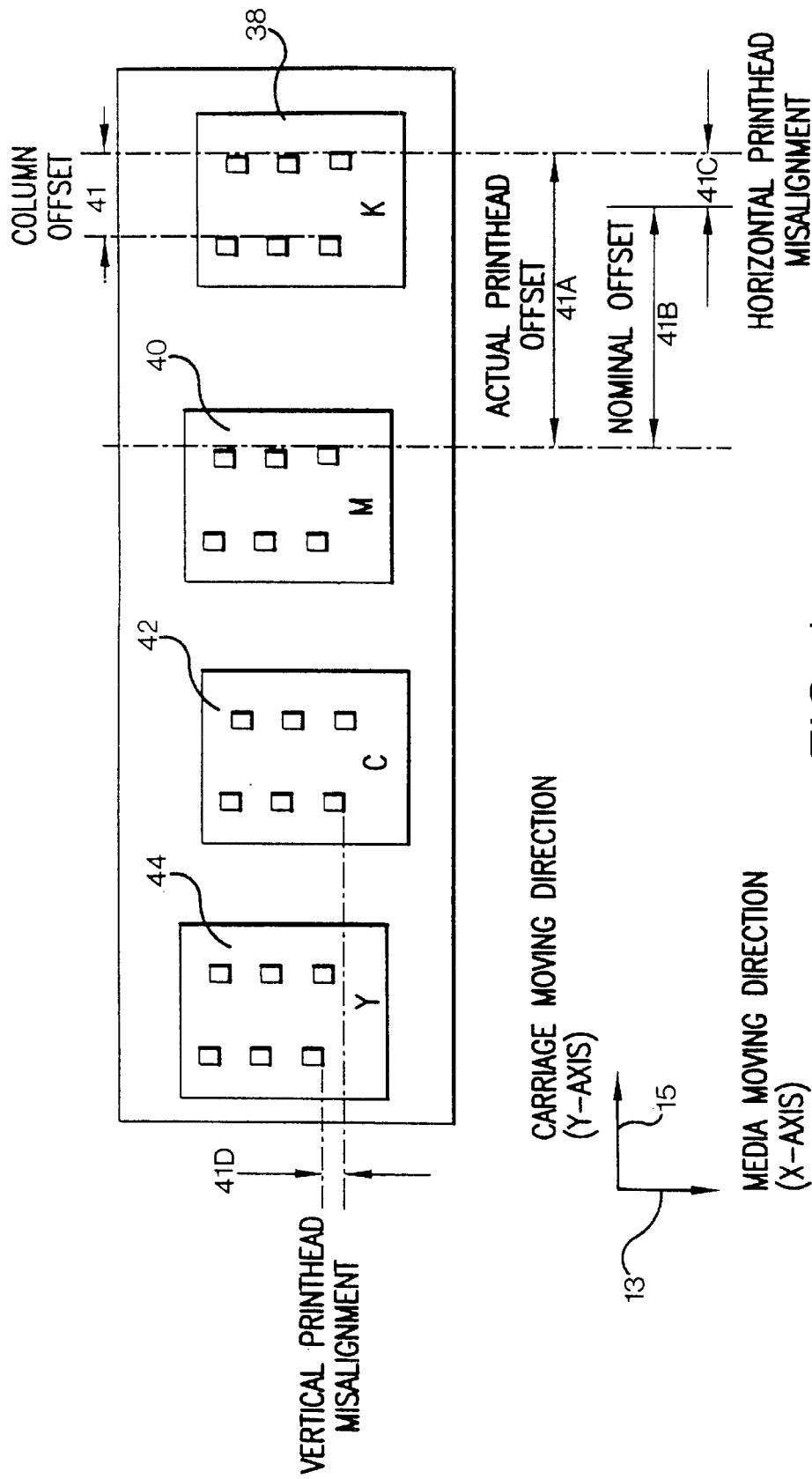
FIG. 4 is a schematic representation of a top view of a carriage showing offsets between individual printheads in the media advance axis and in the carriage scan axis.

FIG. 4 shows a presently preferred embodiment of printheads 38, 40, 42, 44 each having two groups of nozzles with a column offset 41. By comparing the relative positions of corresponding nozzles in different printheads along the Y axis, it is possible to determine an actual horizontal offset 41A between two printheads, and by comparison with a nominal default offset 41B determine an actual offset 41C in the carriage scan axis. This is repeated for all of the different printheads while they remain on the carriage.

Similarly, by comparing the relative positions of corresponding nozzles in different printheads along the X axis, it is possible to determine an actual vertical offset 41D in the media advance axis. This is also repeated for all of the different printheads while they remain on the carriage.

Figure 5:
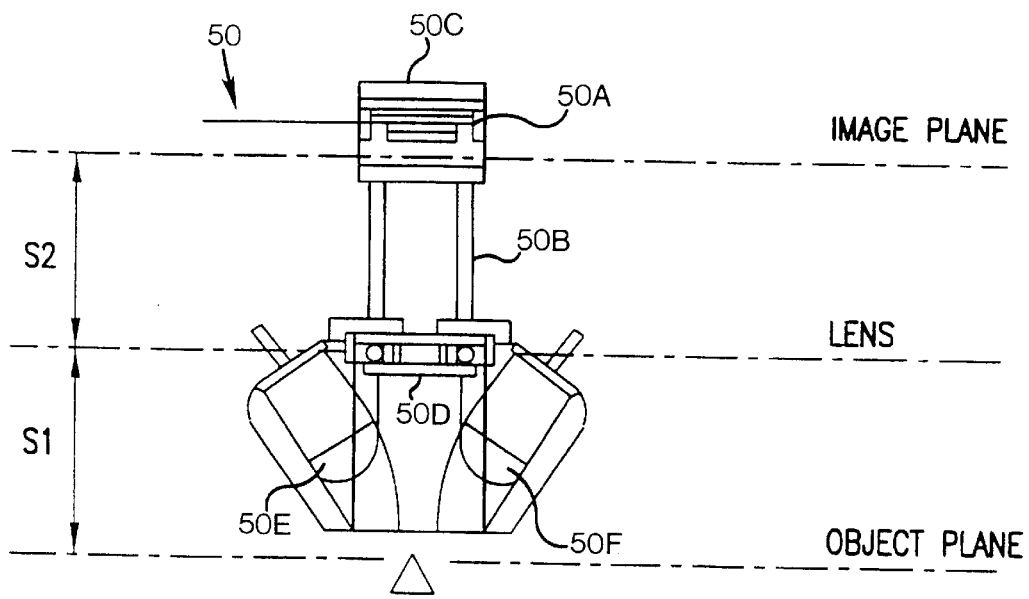
FIG. 5 is a front view of the optical components of the sensor unit of FIG. 4.
Figure 7:
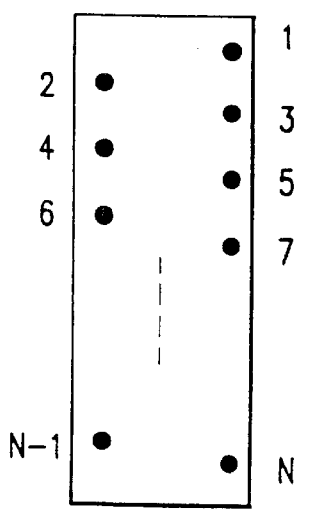
FIG. 7 schematically shows the nozzle plate of a 600 dpi print carriage having one column of ink-ejection nozzles separated from another column of ink-ejection nozzles.
Figure 8:
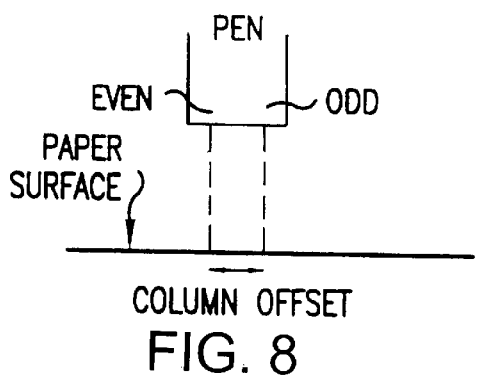
FIG. 8 schematically shows the print cartridge of FIG. 7 in printing position over a print zone.
Figure 6B:
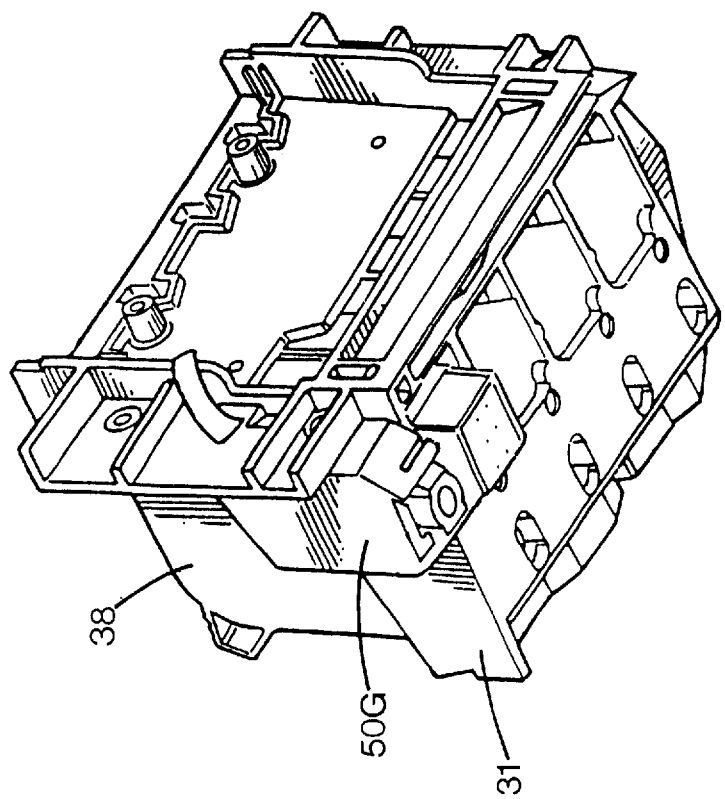
FIGS. 6A and 6B are isometric views respectively looking downwardly and upwardly toward the carriage showing the optical sensor and one print cartridge mounted on the carriage.
Figure 6A:
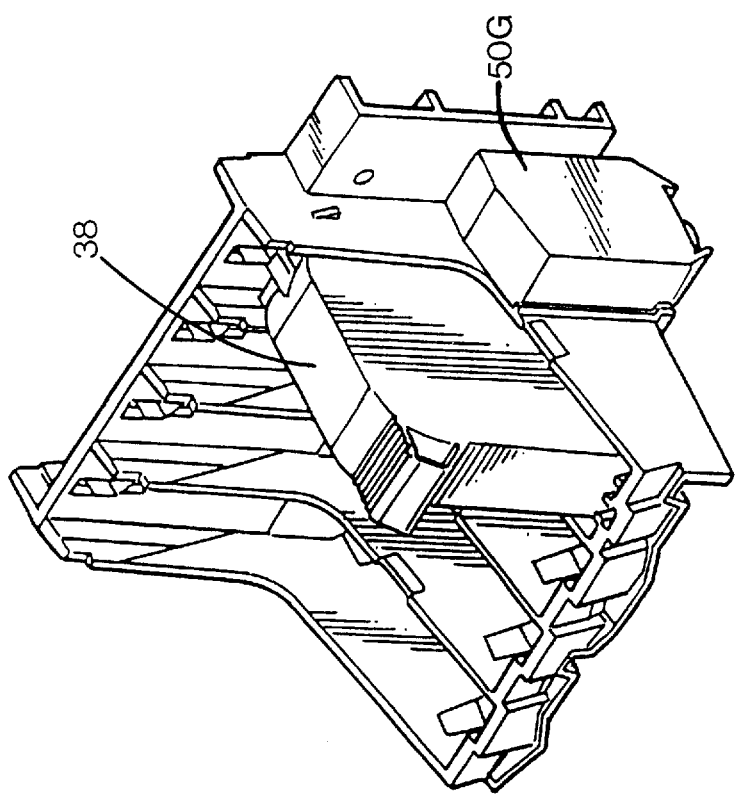

In order to accurately scan across a test pattern line, the optical sensor 50 is designed for precise positioning of all of its optical components. Referring to FIGS. 5, 6A and 6B, the sensor unit includes a photocell 50A, holder 50B, cover 50C, lens 50D; and light source such as two LEDs 50E, 50F. A protective casing 50G which also acts as an ESD shield for sensor components is provided for attachment to the carriage.

Additional details of the function of a preferred optical sensor system and related printing system are disclosed in corresponding application Ser. No. 08/551,022 filed Oct. 31, 1995 entitled OPTICAL PATH OPTIMIZATION FOR LIGHT TRANSMISSION AND REFLECTION IN A CARRIAGE-MOUNTED INKJET PRINTER SENSOR, which application is assigned to the assignee of the present application, and is hereby incorporated by reference.

The optical sensor in this exemplary embodiment includes two LEDs, one green and one blue. The green LED is used to scan all of the patterns except the patterns used to obtain information from the yellow ink printhead. The signal read from the optical sensor is processed and entered to an analog-to-digital converter.

SAD errors, also sometimes known as column separation errors, consist in perpendicularity errors of the drop ejection direction with the respect to the nozzle plate in the plane YZ. SAD errors often manifest themselves symmetrically in the two nozzle columns of the printheads. SAD errors are measured as a column to column offset; two nozzles that are a distance d apart from each other in the printhead eject two droplets that fall on the print medium with an offset d'. This is illustrated in FIG. 9, wherein printhead 38 with corresponding nozzles of nozzle columns 38A, 38B spaced apart by distance d eject droplets that fall on the print medium a distance d' apart.

An optical light intensity sensor (optical sensor) is used to measure the light reflected from a media having formed or applied thereon one or more marks. This is illustrated in FIG. 10A, in which the optical detector 80 and associated optical elements 82 (such as a lens or lens system) comprising the optical sensor is moved relative to the medium 84 bearing a mark 84A. The optical sensor is moved over the media (using a mechanical scanning system) in order to find the mark 84A. The optical sensor has a viewing area or field of view 82A at the plane of the medium. Changes in the reflectivity of the medium in front of the optical sensor change the signal output, shown as waveform 86A, with different characteristics depending on the sensitivity characteristics of the optical sensor.

The optical detector 80 has a photosensitive area or areas. With the optical elements 82 between the detector and the target (with axial symmetry), the detector 80 produces electrical sensor signals 86A that follow the optical transfer function (OTF) of the optical system. This OTF is the response of the optical sensor from the light reflected from the media.

The spatial response of the sensor is the mapping of the signal from the sensor in response to a point light source scanning along the viewing area of the optical system. The optical response can be defined mathematically as the "point spread function" (PSF), i.e. the response of the detector system to light from a point in space. FIG. 10C illustrates the spatial response of the sensor, determined by mapping the PSF along all the points of the space to be analyzed, here the space along the media plane. The values of the coordinates in FIG. 10C for this example are in space coordinates of $1/1200$ inch.

The sensor signal 86A output by the optical detector when the sensor is scanning across the mark 84A on the media is the mathematical convolution of the reflectivity of the mark 84A and the spatial response of the optical sensor. The mathematical property of the convolution of the signal is employed in accordance with an aspect of the invention. If the nominal size of the mark to be detected is similar to or larger than the optical sensor viewing area, as indicated in FIG. 10A, the optical sensor signal is dominated by the shape of the mark. However, if the size of the mark to be detected is smaller than the sensor viewing area, the sensor signal is dominated by the response curve of the optical sensor.

If the size of the mark is bigger than the viewing area of the optical sensor, as indicated in FIG. 10A, the resulting sensor signal has a plateau in the maximum of the signal. The plateau adds inaccuracies in determining the position of the center of the mark, and non-uniformities in the marks on the medium can produce lack of consistency of the plateau, introducing erroneous center position signals.

If the optical sensor can be modeled like a first order OTF (corresponding to a normal curve), and the size of the mark is smaller than the sensor viewing area, the position of the mark on the media can be calculated with the precision of the mechanical scanning system of the optical sensor. This system provides a much better technique to find the center of the mark because the signal has a clear and sharp peak corresponding to the center. This is illustrated in FIG. 10B, where the size of the mark 84B is smaller than the size of the viewing area 82B of the sensor. This produces a corresponding sensor signal 86B, with a clear and relatively sharp peak.

One application for this aspect of the invention is the alignment system for inkjet printers using multiple pens. To align the pens, some marks are printed on a white media and the positions of the marks are measured to obtain the error of the pen position. With those errors and some additional calculations, the correction necessary to apply at the pens can be determined.

To apply this system to a printing system or other application, the viewing area of the optical system of interest is known or determined, and the marks to be detected are sized smaller than the sensor viewing area dimension in the direction in which the measurement is to be made. For example, if the application need only know the carriage axis position, the dimension of the lines can be made larger than the viewing area in the paper axis direction, and smaller than the viewing area dimension in the carriage axis direction.

In a general sense, the dimension of the target to be measured is smaller than the sensor viewing area dimension (s) of the sensor system. Good results are typically obtained with a mark size between about 0.5 and 0.75 of the sensor viewing area dimension(s). Of course, the smaller the mark in relation to the sensor viewing area, the higher the resolution but at the expense of signal strength. In other words, when the marks are made smaller than the viewing area of the optical sensor, there is not a lower limit on the size of the mark, and the designer is guided by the necessity of having a minimum sensor signal to measure correctly. If the mark is very dark, a smaller mark can be used, while obtaining better resolution.

Pen primitives for purposes of this invention are groupings of nozzles in the same pen column that are fired together for alignment purposes. Typically the nozzles in a primitive can be fired in advance or delay with respect to the firing pulse, due to a correction with the purpose of correcting for aberrations such as scan axis directionality (SAD) or adjacent primitive centroid separation (APCS) problems. This can be done with circuitry on the pen which controls the firing of the nozzles, or by circuitry off the pen which determines the firing of the pen nozzles. Pen primitives are described in detail in co-pending application Ser. No. 09/199,882, entitled ALIGNMENT OF INK DOTS IN AN INKJET PRINTER, filed Nov. 24, 1998, the entire contents of which are incorporated herein by this reference pending application Ser. No. 09/199,882, and illustrated in FIG. 3 thereof. SAD errors, also sometimes known as column separation errors, consist in perpendicularity errors of the drop ejection direction with the respect to the nozzle plate in the plane YZ. SAD errors often manifest themselves symmetrically in the two nozzle columns of the printheads. SAD errors are measured as a column to column offset; two nozzles that are a distance d apart from each other in the printhead eject two droplets that fall on the print medium with an offset d'. This is illustrated in FIG. 9, wherein printhead 38 with corresponding nozzles of nozzle columns 38A, 38B spaced apart by distance d eject droplets that fall on the print medium a distance d' apart.

In one exemplary embodiment, the pen primitives are groups of 16 nozzles, and the printer electronics and firmware use logical primitives which include 32 nozzles (less at the ends of the printhead depending on the paper axis correction). The logical primitives can be fired in advance or with delay to their nominal firing time. This is described more fully in application Ser. No. 09/199,882, entitled ALIGNMENT OF INK DOTS IN AN INKJET PRINTER, referenced above.

In the following exemplary embodiments, a given printhead has primitives of 19 nozzles each, and each printhead column will have 8 primitives. The printhead has two columns, the odd column and the even column. The odd column contains even primitive numbers; the even column contains correspondingly odd primitive numbers. Of course, a printhead can have fewer or greater numbers of nozzles, controlled in larger or smaller primitives.

To accomplish a printhead alignment procedure, a printhead pattern is printed. This alignment procedure is typically performed at printhead replacement, either immediately after the replacement, or after a power up and a new printhead is detected. Alternatively, the printhead alignment procedure can be manually triggered by the user through a printer front panel input.

Figure 11A:
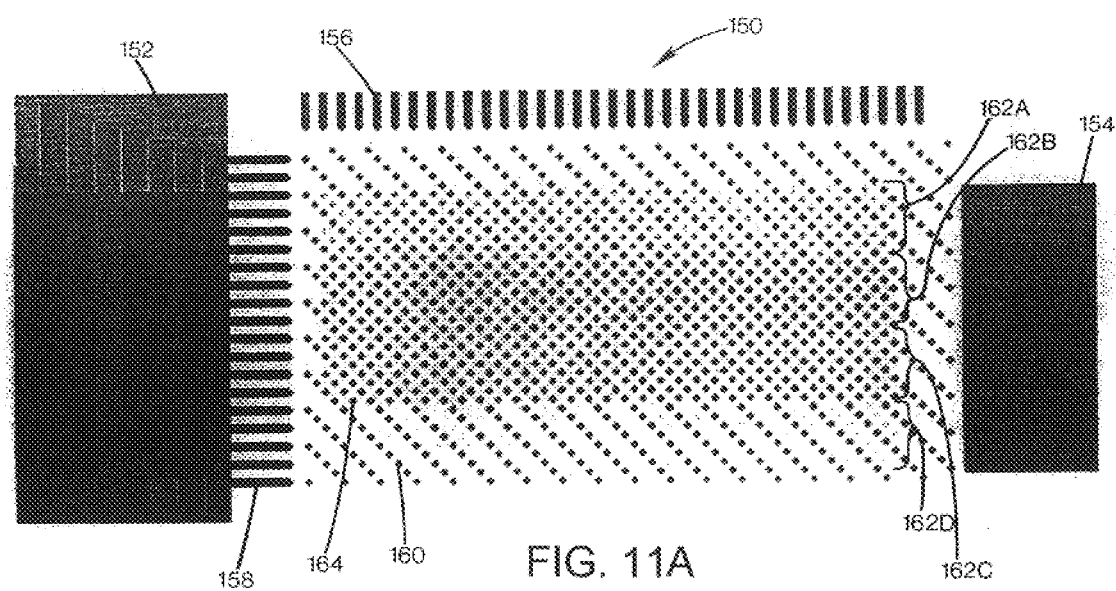
FIG. 11A illustrates an exemplary printhead alignment pattern in accordance with an aspect of the invention.

The measurement techniques described above can be employed in the measurement and use of alignment patterns for aligning printhead nozzle arrays in an inkjet printing system. In accordance with another aspect of the invention, an alignment pattern printed by the printing system onto a print medium is a general pattern and does not have to take into account any particular defect to correct. FIG. 11A illustrates an exemplary embodiment of an alignment pattern 150. The pattern includes left and right border regions 152, 154, which are printed to have the pens in good printing health to print the marks of interest. The regions 152, 154 are printed with all pens and all nozzles at 25% ink coverage to avoid placing too much ink on the medium. The regions 152, 154 are made up of repeated or replicated fundamental cells, with each cell a two-by-two dot cell. Each dot of the fundamental cell is formed by a drop of a given one of the respective colors, CYMK, with each drop placed by a single pen nozzle. So if the print resolution or nozzle spacing in an exemplary printer is 1/600 inch, or 43 μm, the fundamental cell is about 86 μm by 86 μm.

Figure 11B:
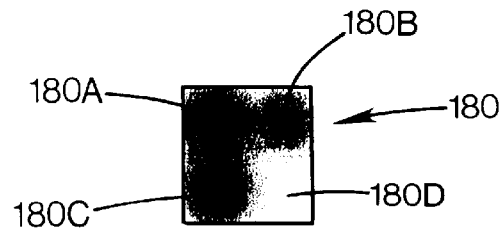
FIG. 11B shows a fundamental cell which is replicated to form border regions and target patches of the pattern.

FIG. 11B illustrates an exemplary unit cell 180 having four quadrants 180A (K), 180B (C), 180C (M) and 180D (Y), with the drop colors as just noted. All of the pen nozzles are utilized to print the border regions, to have the nozzles in good printing health.

The pattern includes a top margin region of spaced short vertical bars 156 and a left margin region of short horizontal bars 158. A first diagonal series of spaced rows 160 of target patches and a second diagonal series of spaced rows 164 of color patches are formed between the left and right border regions and the top border region, with the second series of rows interleaved with the first series of rows. The spacing of the target patches and the color patches is such that the target patches and color patches also lie in horizontal rows and vertical columns (as viewed in FIG. 11A). The rows 164 of color patches are shorter than the rows 160.

Each of the horizontal bars 158 is aligned with a corresponding row of target patches and color patches. Similarly, each of the vertical bars 156 is aligned with a row of target patches and color patches. The width of the bars 156, 158 is equal to the corresponding dimension of the target and color patches. Nominally, the bars are spaced apart by a distance equal to their thickness, leaving a white space between adjacent bars equal to the thickness of a target or color patch.

The white spaces are also aligned with a row of target patches and color patches.

The horizontal and vertical bars 158, 156 are used to target the optical sensor 80 (FIG. 10A) for the maximum signal for the scan to be performed. Thus, for a horizontal scan, the carriage is moved so that the sensor is over a horizontal bar 158, and the print medium bearing the pattern 150 is moved incrementally about the bar to position the bar in a vertical sense to maximize the sensor signal. This optimizes the sensor signal for detecting patches in a horizontal row aligned with the horizontal bar. The medium is then held in this position, and the carriage moved for the horizontal scan. The bars are used successively to position the sensor for succeeding horizontal scans.

In a similar fashion, vertical scans are performed by positioning the sensor over a vertical bar 156, and incrementally moving the carriage about the bar to maximize the sensor output signal. With the sensor held in the position maximizing the signal when sensing the vertical bar, the print medium is then moved along the media axis to scan a vertical row of patches.

To optimize the sensor position for scanning rows and columns aligned with a white space between bars, the sensor is positioned between the bars so as to minimize the sensor output.

The pattern 150 includes small target patches, printed using the fundamental pattern of FIG. 11B, with groups of nozzles of the different pens, and these target patches form the diagonal rows 160. All target patches are printed using the same nozzles of each pen. In this exemplary embodiment, the target patches are printed using one odd and one even primitive of each pen, with the odd and even primitives formed by 32 adjacent nozzles. The same groups of nozzles of each pen are used to print each of the target patches which are arranged in the diagonal rows 160 for the pattern 150.

To further explain the target patches, each target patch is printed using the same nozzle groups in each pen. Moreover, each target patch is formed by use of only the same subset of the nozzles in each pen. Thus, each target patch is of a predetermined shape, such as circular, rhomboidal, square or the like, and each target patch is printed by use of the same subsets of the nozzles in each pen. The target patches are printed by replicating in closely spaced order the fundamental cell pattern of FIG. 11B.

The pattern further includes a number of color patches each formed by nozzles of one pen, and these color patches form the rows 164. Each color patch is a monochrome patch, printed using only a group of nozzles of one pen. The color patches printed for each color are arranged in different horizontal color band regions, indicated as regions 162A, 162B, 162C, 162D, where the color patches in rows 164 are respectively printed by the cyan (C) pen, the black (Y) pen, the magenta (M) pen and the yellow (Y) pen. Thus, all color patches in region 162A are printed by the cyan pen, all color patches in region 162B by the black pen, all color patches in region 162C by the magenta pen, and all color patches in region 162D by the yellow pen or nozzle array.

The set of color patches in a given band are printed using, for different ones of the color patches, all of the nozzles of that pen, with each one of the color patches printed using only a subset of the nozzles on that printhead. A given color patch is printed with enough nozzles to provide a large enough patch to allow accurate optical sensing. In this exemplary embodiment, each color patch is printed using only the odd column or the even column nozzles in a primitive, i.e. 16 nozzles. Moreover, different ones of the color patches in a color band can be printed using different subsets of the nozzles on the printhead, so that directional aberrations in all the subsets of nozzles can be measured with the pattern 150. Thus, the color patches printed in horizontal color band regions 162A are collectively printed using different groups of the cyan printhead nozzles, so that the color patches in band region 162A include one or more patches printed by all the groups of cyan nozzles in the printhead, allowing the measurement of position of each group of cyan nozzles. Similarly, regions 162B, 162C, 162D respectively each include color patches printed by all groups of nozzles for the respective black, magenta and yellow printheads, so that the positions of all groups of nozzles for these pens can be measured.

Figures 12A, 12B, 12C:
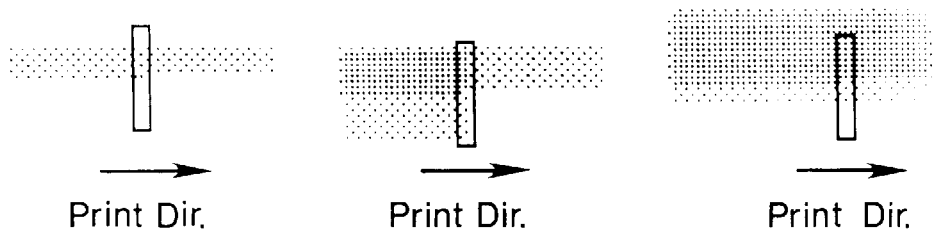
FIGS. 12A–12C illustrate printing of target and color patches of the pattern of FIG. 11A.

To print the pattern 150 in an exemplary embodiment, the pattern is printed from top to bottom, with respective horizontal swaths printed, so that some portions of border regions are printed before printing target and color patches. To print the patches in the pattern 150 in an exemplary embodiment, a first row of target patches is printed, using the same group of nozzles of all the pens. The print medium is advanced by the distance between adjacent rows, and the next row of target patches is printed. The medium is again advanced by this distance to print another row of target patches. Eventually, a point in the pattern is reached when the color patch locations are reached. The set of color patches for a given color are printed using in aggregate all the nozzles in the given pen corresponding to the given color in a single pass. The next pass, target patches are again printed using the same group of nozzles selected for printing the target patches. This is illustrated in FIGS. 12A–12C. FIG. 12A illustrates the pens printing target patches using a center group of nozzles in each pen. FIGS. 12B and 12C illustrate the printing of color patches and target patches as printing proceeds on the pattern 150. The target patches are constituted by the repeated fundamental cells of FIG. 11B. The color patches have a circular shape, or a rhomboid shape, like a square turned 45° on diagonal, in this exemplary embodiment.

The function of the target patches is to provide fiducial references on the print medium on which the pattern has been printed. Based on this information, the position in both axes of every color patch can be measured and calculated. In this embodiment, the X axis corresponds to the pen movement or scan direction, and the Y axis to the media movement direction.

Figure 13:
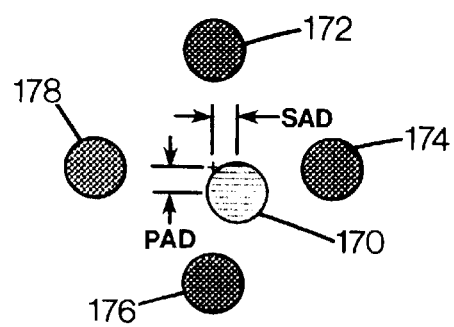
FIG. 13 shows individual patches forming the pattern of FIG. 11A.

FIG. 13 illustrates one circular color patch 170 with four circular target patches 172, 174, 176, 178 surrounding the patch 170 at 90° spacings. In this exemplary embodiment, each patch has a nominal diameter of 38 dots or pixels in size, and the spacing in X and Y on center from the center patch is 86 dots or pixels. The average position of all the patches 172, 174, 176, 178 in both the carriage axis and media axis directions, as measured during an optical scanning mode using the optical sensor system 80, is used to calculate the origin from which the error on the position of patch 170 is calculated. The error from the theoretical center in both axis (SAD and PAD) is stored and is used a posteriori to tabulate the corrections to apply during normal printing operations. Thus, in a calibration or alignment mode, the printing system prints the pattern 150, and the optical sensor is used in measuring characteristics of the pattern. With the values obtained in the measurement, any error can be tabulated making some mathematical operations with the values.

In an exemplary embodiment, the error values calculated as a result of the measurement can be arranged in matrix notation $err_{i,j,k,l,m}$, where i∊[SA, PA] Scan Axis (SA) or Paper Axis (PA)
j∊[rl, lr] Right to Left, or Left to Right
k∊[ODD, EVEN] Odd nozzle or Even nozzle
l∊[K,C,M,Y] Color (black, cyan, magenta, yellow]
m∊[1 . . . n] Number of primitives by row of the pen Once the values are put in matrix form, the calculus to obtain the alignment parameters are:

ODD-EVEN $$OD_l = \sum_{j=rl}^{lr} \sum_{m=1}^{n} (err_{SA,j,ODD,l,m} - err_{SA,j,EVEN,l,m})$$

BIDIRECTIONAL $$BIDIR_i = \sum_{k=ODD}^{EVEN} \sum_{m=1}^{n} (err_{SA}, rl, k, l, m - err_{SA}, lr, k, l, m)$$

PEN-to-PEN $$P2P_{i,l} = \sum_{j=rl}^{lr} \sum_{k=ODD}^{EVEN} \sum_{m=1}^{n} (err_i, j, k, l, m - err_i, j, k, Y, m)$$

The use of the yellow in the formula results from an exemplary printer implementation in the manner in which the hardware registers programming of the alignment. The origin is the most right pen of the carriage (Yellow in this exemplary implementation).

Theta-Z $$\theta_{z_i} = \arctg \left[ \frac{\sum_{j=rl}^{lr} \sum_{k=ODD}^{EVEN} (err_{SA,k,k,l,1} - err_{SA,k,k,l,n})}{\sum_{j=rl}^{lr} \sum_{k=DD}^{EVEN} (err_{PA,j,k,l,1} - err_{PA,j,k,l,n})} \right]$$

This angle is converted to a shift in the scan axis direction (y) to apply at every nozzle of the pen. Thus, to have a pen with a column of nozzles firing in perfect vertical order, the firing pulses are adjusted by the shift to effect a distance change equal to I sin(ϕ).

Intra-PAD Compensation

Define the vector $$SADshape_{i,m} = \sum_{j=rl}^{lr} \sum_{k=ODD}^{EVEN} err_{SA,j,k,l,m}$$

which represents the error of the pen l in m sections. A curve can be calculated which models these points and compensates the firing position at every section.

The pattern 150 is formed by repeating the pattern of FIG. 13. Arranging the pattern on diagonal, two of the targets used for one color patch can also be used for other color patches. This reduces the number of target patches needed for the pattern. For example, if one is to measure the position of a group of nozzles in both directions, and thus four target patches are created for every color patch, the total number of patches to be printed and measured is five times the number of color patches. For 18 color patches, a total of 90 patches would be used. However, by arranging the patches in the configuration shown in FIG. 11A, so that some target patches are used for multiple color patch measurements, the total number of patches is reduced.

The target marks are printed with the same, fixed part of the pens and thus include contributions from all pens. Since all the target marks are printed with the same part of the pens and are created with the same pattern as was used to print the border regions, this provides uniformity to all the target marks and the reference to find the errors, i.e. the deviations from the target marks.

This alignment technique is used when a new pen or set of pens is installed in the printer, when the user requests alignment, or when the print quality is degraded due to changes in the directionality of the pens.

There are several advantages to this new alignment technique. The pattern is independent of the particular correction or metrics to be applied to the pens. New metrics can be calculated along the time frame of the design of a printing system, or even after printers have been put in the field and updated with software updates, without the necessity to change the pattern. This provides flexibility in developing new metrics. Another advantage is that the amount of the print medium used in the alignment algorithm is relatively small, due to the relatively small size of the pattern shown in FIG. 11A.

The algorithm is independent of the particular pen type, in that changing the pen type requires only that the pattern be changed to reflect the new architecture of the new pen type, i.e. the number of nozzles per group or the number of groups per pen. In general, to align a printing device having different, separate printing systems or pens, with an optical sensor to provide the position of marks on the medium, this algorithm can be applied in the following manner.

1. Group the nozzles (or the smallest printing systems) in sets with a footprint smaller than the area of the position sensor.
2. Print the pattern 150, and gather the position data from the sensor.
3. Perform the calculations needed to fulfill the alignment requirements for the particular application.

Another advantage is that the target patches are fired by the same group of nozzles, providing a unique reference.

Another aspect of the invention is a technique to simplify the calculations needed to find the center point of each target or color patch or mark. The output of the sensor system 80, with the carriage position encoder, gives an array of values (spatial position (x) and signal (s) from the optical detector) that follows a normal or guassian curve, with a width sigma ($\sigma$), i.e. the distribution of a variable of mean c (center), with a deviation due to random noise of value $\sigma$. Thus, the array $(x_i, s_i)$ follows the curve:

$$s = (Amp) \, e^{((x-center)/\sigma)^2}$$

Taking the derivative of s with respect to x provides the following result:

$$\frac{\partial s}{\partial x} = \left((Amp)e^{(-(x-center)/\sigma)^2}\right)(-2)(x-center)/\sigma^2$$

Substitute s in the formula of the derivative provides:

$$\frac{\partial s}{\partial x} = s(-2(x-center))/\sigma^2$$

Reordering the equation provides:

$$\frac{\frac{\partial s}{\partial x}}{s} = \left((-2)/\sigma^2\right)(x-center)$$

This relationship is linear with two properties. The first is that the intersection with the X axis occurs at the value of x equal to the center of the curve. The second property is that the slope is a function of the width of the curve (sigma).

Figure 14:
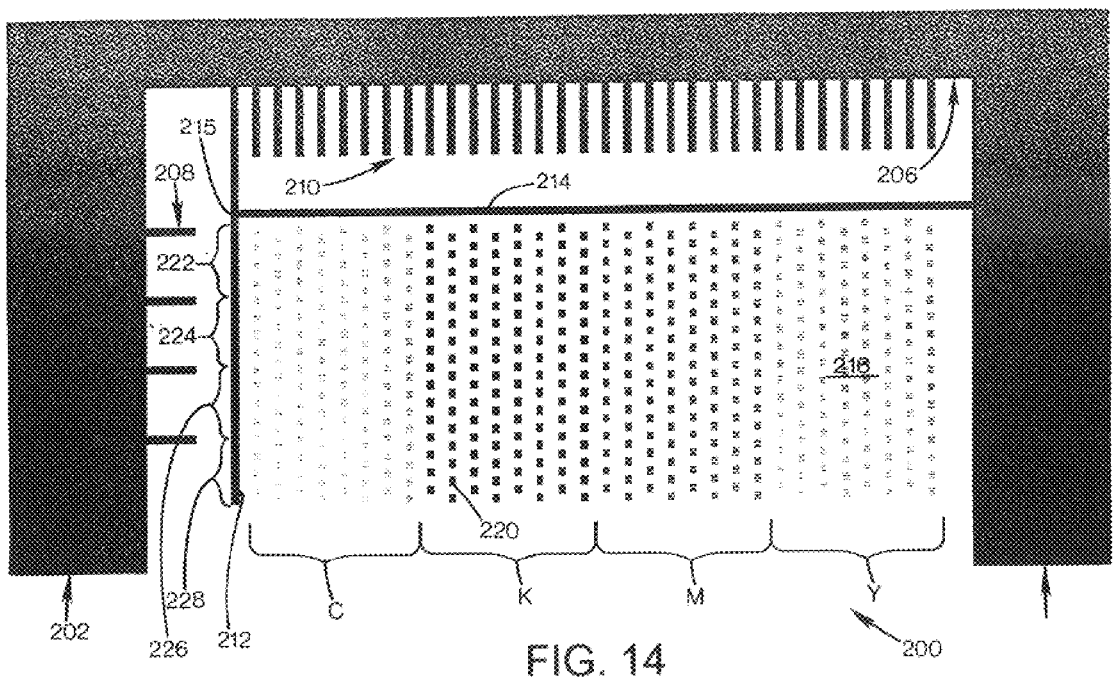
FIG. 14 illustrates an alternate printhead alignment pattern in accordance with another aspect of the invention.

The algorithm for finding the center of the mark can be transformed, in accordance with this aspect of the invention, from an algorithm for fitting to a normal curve that is nonlinear, with iterations and matrix operations, to a linear fitting algorithm. This provides a huge reduction in the amount of processing operations. Thus, from the scanning of the pattern 150, a vector of pairs of data $(x_i, y_i)$ representing the position (in scan or carriage axis) and the signal amplitude measured by the sensor. FIG. 14 illustrates one algorithm 250 for performing the fitting. At steps 252–256, a loop is performed over the vector $(x_i, y_i)$ to provide $a_i = (y_{i+1} - y_{i-1})/x_i$. This loop provides the linear equation (258) for $\partial s/\partial x$ versus the position. This relationship is linear with the zero in x=the center of the curve. The linear relationship is solved for $a_i = 0$ at 260, and the solution is the center of the mark.

One advantage of this technique for calculating the position of the media marks include the reduction in the number of mathematical operations necessary to determine the center of the media mark. This measured center is subtracted from the theoretical or nominal position to provide the error in position of the mark, and is the data placed in the matrix $err_{i,k,k,l,m}$. Further, the technique can provide fundamental data of the fit curve (the center and the sigma value).

The pattern 150 of FIG. 11A has color marks or patches, and reference or target marks or patches to obtain the error position of the color patches. The system finds the position of every patch in both axis (X and Y) and make some mathematical calculations to obtain the error of the color patches. To calculate the position of a pattern of m horizontal color marks by n vertical color marks, the total number of patterns whose position is determined, i.e. both target patches and color patches, is 2m+2mn+n. For the pattern illustrated in FIG. 11A, there are 16×32 color patches whose position is to be determined, resulting in 1104 patches whose position is to be measured.

In accordance with another aspect of the invention, the number of patches needed to find the position is reduced to m times n, by use of an alignment pattern illustrated in FIG. 14 as pattern 200. This pattern includes solid left, right and top margin regions 202, 204, 206, which are printed with all nozzles at 25% ink density to avoid too much ink on the medium. These regions are printed to ensure that the pens are in good printing health to print the pattern marks or patches of interest whose position is to be measured. The left, side and top margin regions 202, 204, 206 are printed by replicating the fundamental cell of FIG. 11B, to ensure that the pens have good printing health for printing the pattern.

A series of horizontal and vertical bars 208, 210 extend from the left margin region and right margin region, respectively. The bars 208 and 210 are printed by replicating the fundamental cell of FIG. 11B. These horizontal and vertical bars are used for aligning the sensor with the row or column to be scanned, in a similar manner as described above with respect to bars 158, 156 (FIG. 11A). For pattern 200, the number of horizontal bars 208 is reduced, since full swath printing is performed to print the pattern color patches.

Vertical bar 212 and horizontal bar 214, with right margin region 204, frame a pattern region 216. The bars 212, 214 are also printed by replicating the fundamental cell of FIG. 11B. These bars 212, 214 intersect at point 215 to provide an arbitrary coordinate reference (0,0). Within the pattern region 216, a series of vertical columns 220 of color pattern patches are formed, by scanning the pens along the carriage (Y) axis. The vertical region C has only cyan ink patches, region K has only black ink patches, region M has only magenta ink patches, and region Y has only yellow ink patches.

The four color regions contain the patches to be measured for each of the colors of the printer; these regions are printed at two different velocities in this exemplary embodiment to correct the bidirectional error, and the pattern is duplicated in the vertical, i.e. two upper swaths duplicate the two lower swaths. Thus, swaths 222 and 226 are printed at a first swath velocity, and swaths 224 and 228 are printed at a second swath velocity, different from the first velocity. Two identical swaths are printed at each velocity to increase the accuracy of the measurement. In this exemplary embodiment, the pattern 200 provides 32×16 color patches or marks to obtain the position of a total of 512 color patches, less than the pattern of FIG. 11A.

Figure 17:
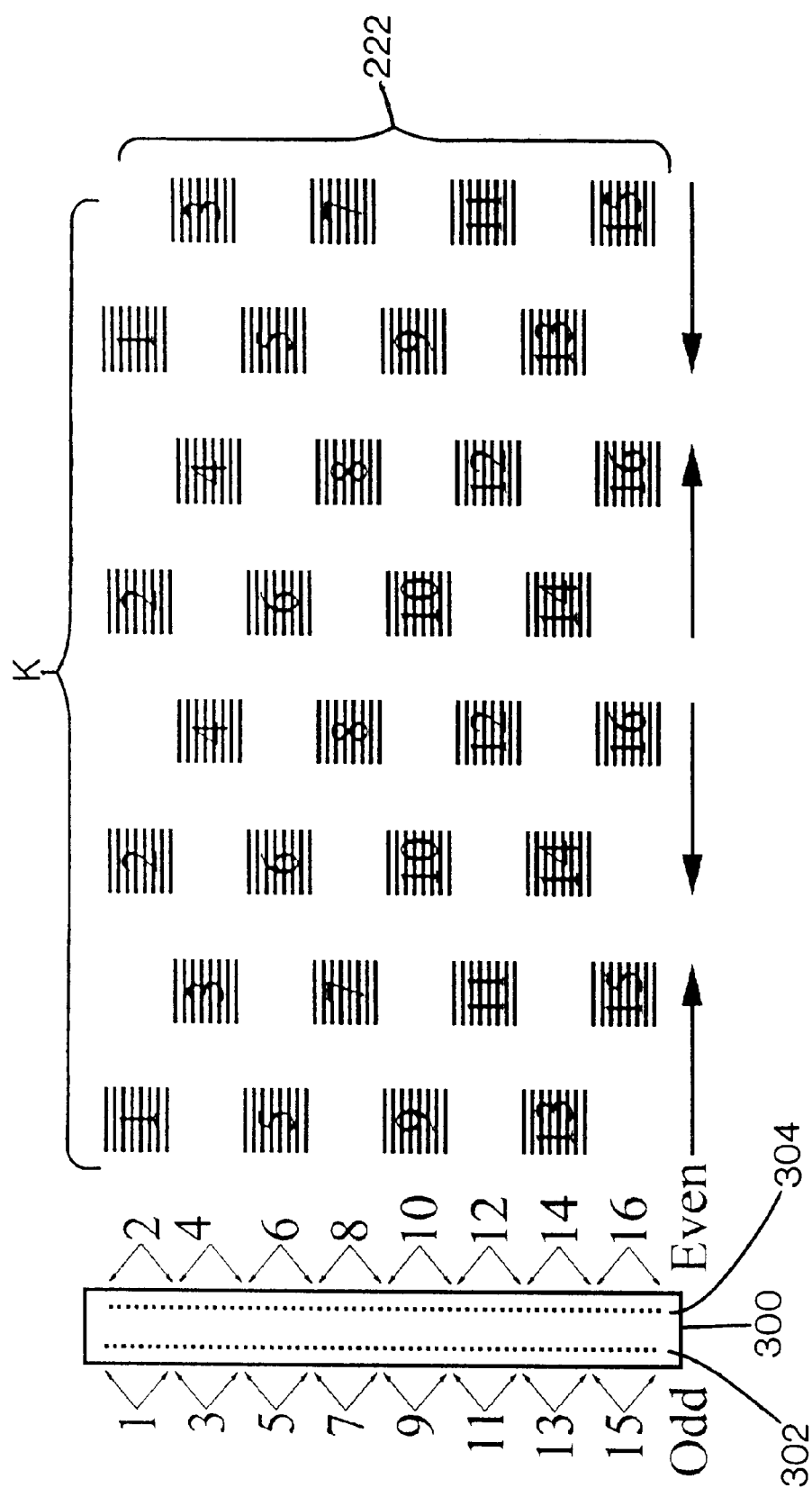
FIG. 17 illustrates aspects of the pattern of FIG. 14.

FIG. 17 further illustrates aspects of the pattern 200 for an exemplary embodiment. In this example, a pen 300 has 128 nozzles in two columns 302, 304 arranged in primitives. Column 302 is the odd column, and has primitives 1, 3, 5, 7, 9, 11, 13 and 15, each of eight nozzles. Column 304 is the even column, and has primitives 2, 4, 6, 8, 10, 12, 14, each of eight nozzles. Thus, the pen 300 has 16 primitives. FIG. 17 shows a pattern of color patches. Assume that the color patches are black patches (a portion of region K) printed in one bidirectional swath 222. The arrows indicate the direction of printing the adjacent patches. It will be seen that adjacent columns of patches are printed in pairs, by the odd or even column nozzles, with half the primitives firing for one of the columns and the other half of the primitives firing for the second column in the pair. With this arrangement of the patches, when scanning in the X direction, or in the Y axis, a patch is always scanned between two white areas.

The theoretical position (theo__$x_i$, theo__$y_i$) of every mark in the pattern is known, and the actual position ($x_i$, $y_i$) of the output of the inkjet device can be obtained using known methods, e.g. by use of the optical sensor. Assume that the centroid 230 of the pattern 200 is the point with position theo__$x_{cen}$, theo__$y_{cen}$:

$$theo - x_{cen} = \frac{\sum_{i=1}^{n \times n} theo - x_i}{(n \times n)}$$

$$theo - y_{cen} = \frac{\sum_{i=1}^{n \times n} theo - y_i}{(n \times n)}$$

The centroid of the output is $x_{cen}$, $y_{cen}$:

$$x_{cen} = \frac{\sum_{i=1}^{n \times n} x_i}{(n \times n)}$$

$$y_{cen} = \frac{\sum_{i=1}^{n \times n} y_i}{(n \times n)}$$

If the origin of the X and Y axes is placed in the centroid of the pattern, the new theoretical position of the color mark will be:

$$theo\_X_i = theo\_x_i - theo\_x_{cen}$$

$$theo\_Y_i = theo\_x_i - theo\_x_{cen}$$

In the same way for the output of the device:

$$X_i = x_i - x_{cen} \quad Y_i = y_i - y_{cen}$$

Now the error in both axes can be tabulated as the difference between the output and the theoretical position:

$$err\_x_i = X_i - theo\_X_i \quad err\_y_i = Y_i - theo\_Y_i$$

Thus, the measurement technique utilizing the pattern 200 includes the following steps:

1. Measure the position of the reference bars and the positions of all the color patches, i.e. bar 212 during the carriage (X) axis measurements and bar 214 during the media (Y) axis measurement.
2. Calculate the distance between the color marks and the reference bars, using the position of bar 212 in the X-axis and the position of bar 214 in the Y-axis, to provide a matrix of points, representing the position of all the color marks, referenced to the origin point 215 (FIG. 14).
3. Calculate the centroid of the point in the matrix.
4. Convert the matrix of step 2 to a matrix of points whose positions are calculated from the centroid calculated in step 3.
5. Determine the error in position of each color patch as the difference between the position obtained in step 4 and the theoretical (nominal) position of the patch in relation to the theoretical (nominal) centroid of each pattern.

The advantages of this aspect of the invention include the reduction in the amount of marks in the pattern to less than half (from 2m+2mn+n to mn), while providing the flexibility of the pattern of FIG. 11A of calculating the error.

Figure 16:
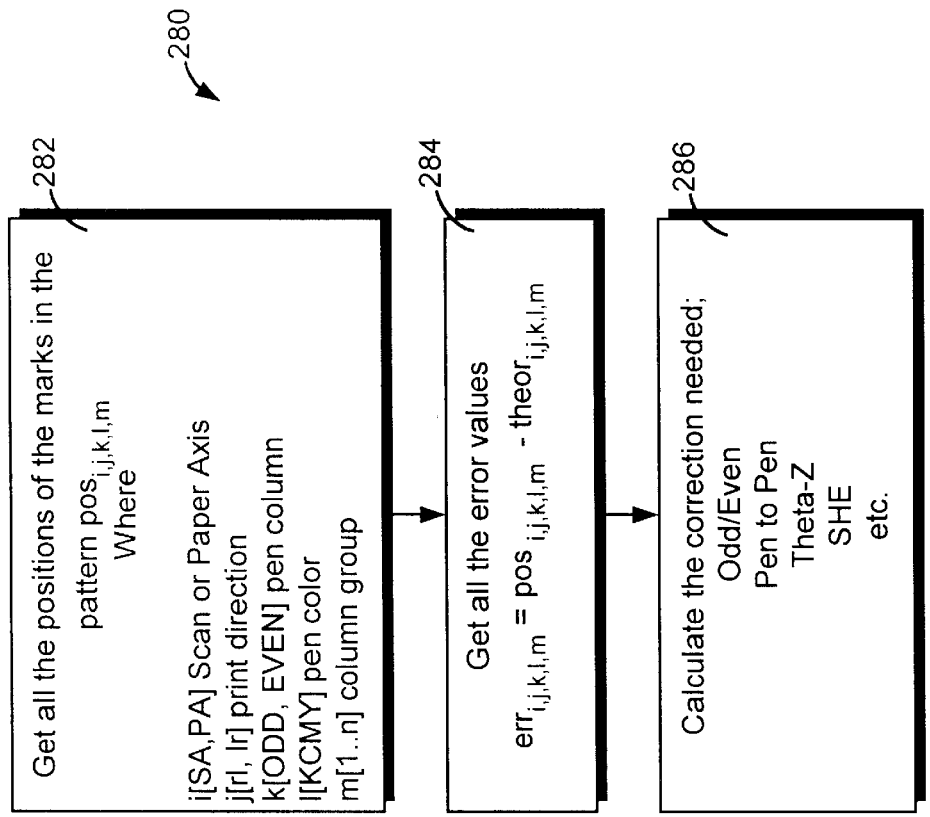
FIG. 16 illustrates an exemplary algorithm for performing a pen alignment using the pattern of FIG. 14.
Figure 15:
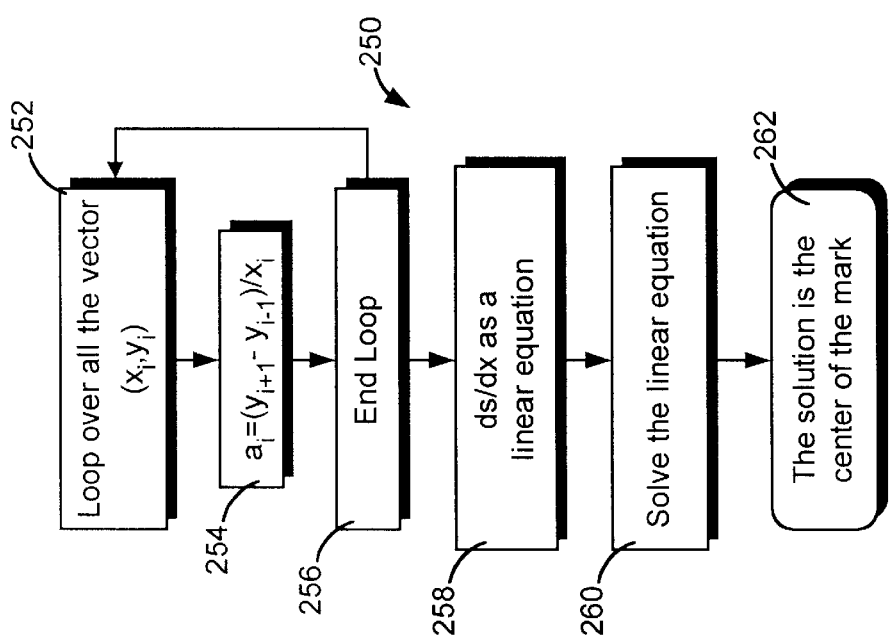
FIG. 15 illustrates an exemplary algorithm for performing fitting to a linear equation.

FIG. 16 illustrates an exemplary algorithm 180 for performing a pen alignment using the pattern 200 of FIG. 14. In this example, the nominal or theoretical position of the patches is given by $theor_{i,j,k,l,m}$. At step 282, the pattern 150 is scanned by the printing system sensor to obtain the measured positions of the pattern patches, $pos_{i,j,k,l,m}$. At 284, the error values are calculated as $err_{i,j,k,l,m} = pos_{i,j,k,l,m} - theor_{i,j,k,l,m}$. From the error values, the corrections to be applied to the pens are calculated.

It is understood that the above-described embodiments are merely illustrative of the possible specific embodiments which may represent principles of the present invention. Other arrangements may readily be devised in accordance with these principles by those skilled in the art without departing from the scope and spirit of the invention. For example, the printing system may have different numbers of pens, i.e. fewer or greater than four pens, with inks of different colors than CYMK. Moreover, the same ink color can be used in more than one pen or in all pens. The foregoing alignment and measurement techniques can be employed for these alternate implementations.

What is claimed is:

1. An optical sensor for detecting the position of marks on a medium, wherein relative motion is provided between the optical sensor and the medium during an optical sensing operation, the optical sensor producing an electrical sensor signal, and wherein the optical sensor has a field of view at the media in a direction of the relative movement, and the marks have a nominal dimension in the direction of the relative movement, and wherein said field of view is larger than the nominal dimension.

2. The sensor of claim 1 wherein the sensor signal output when relative motion is produced between the sensor and the medium is the mathematical convolution of a reflectivity of the mark and a spatial response of the optical sensor, and the sensor signal is dominated by the spatial response of the optical sensor.

3. The sensor of claim 1 wherein the sensor signal amplitude produces a localized peak when scanning a central part of the mark.

4. The sensor of claim 1 wherein the nominal dimension does not exceed 75% of the sensor field of view.

5. A method for detecting the position of marks on a medium, comprising:
providing an optical sensor having a viewing area, the sensor producing an electrical sensor signal;
providing the medium with marks having a nominal dimension, and wherein said field of view is larger than the nominal dimension;
providing relative motion between the optical sensor and the medium during an optical sensing operation, whereby the sensor signal is dominated by the optical response function of the sensor.

6. The method of claim 5 wherein the sensor signal output when relative motion is produced between the sensor and the medium is the mathematical convolution of a reflectivity of the mark and a spatial response of the optical sensor, and the sensor signal is dominated by the spatial response of the optical sensor.

7. The method of claim 5 wherein the nominal dimension does not exceed 75% of the sensor field of view.

8. A color inkjet printer, comprising:
a plurality of printheads mounted in a scanning carriage for movement along a scan axis, the printheads for printing inks of different colors, each printhead including a column of nozzles arranged generally transverse to the scan axis;
a media drive system for moving the print medium along a media axis generally transverse to the scan axis;
an optical sensor system for detecting the position of marks printed by the printheads on a medium, wherein relative motion is provided between the optical sensor and the medium during an optical sensing operation, the optical sensor producing an electrical sensor signal, and wherein the optical sensor has a viewing area at the medium in a direction of the relative movement, and the marks have a nominal dimension in the direction of the relative movement, and wherein said viewing area has a dimension in the direction of the relative movement larger than the nominal dimension.

9. The printer of claim 8 wherein the nominal dimension is less than 75% of the sensor field of view.

10. A method of sensing directional aberrations among ink-jet nozzles of a plurality of printheads mounted on a scanning carriage, comprising:
printing an alignment pattern on a print medium, the alignment pattern comprising a set of target marks each printed using a subset of the nozzles on each of said plurality of printheads, and a set of monochrome marks printed using a subset of the nozzles from only one of said printheads, each of said monochrome marks positioned in a nominal position with respect to a corresponding plurality of the target marks; and
optically scanning said alignment pattern to determine measurements of relative positions between the monochrome marks and corresponding target marks.

11. The method of claim 10, further comprising:
processing the measurements to determine directional aberrations between nozzles of the selected one of said printheads.

12. The method of claim 10 wherein said corresponding plurality of said target marks is arranged symmetrically about a corresponding one of the monochrome marks.

13. The method of claim 12 wherein said corresponding plurality of said target marks includes four target marks arranged at 90 degree spacings about the corresponding one of the monochrome marks.

14. The method of claim 10 wherein the plurality of printheads includes a black ink printhead, a cyan ink printhead, a magenta ink printhead and a yellow ink printhead.

15. The method of claim 10 wherein said target marks are printed by replicating a fundamental cell pattern formed by single droplets of ink deposited by a nozzle of each printhead.

16. The method of claim 15 wherein said droplets of ink are deposited at respective nominally nonoverlapping positions in a cell grid.

17. The method of claim 10 wherein said step of optically scanning said alignment pattern includes scanning the pattern with an optical sensor having a field of view at the pattern, and the target marks and the color marks have a nominal dimension, and wherein said field of view is larger than the nominal dimension.

18. The method of claim 10 wherein the target marks include an elongated first mark disposed in a scan direction of scanning movement of said scanning carriage, and an elongated second mark disposed in a media moving direction transverse to said scan direction.

19. The method of claim 18, wherein said optically scanning said alignment pattern includes:
1) measuring the position of the first and second elongated marks and the positions of the monochrome marks;
2) calculating distances between the monochrome marks and the respective first and second elongated marks, to provide a matrix of points, representing the position of all the monochrome marks, referenced to the first and second elongated bars;
3) calculating the centroid of the points in the matrix;
4) converting the matrix of step 2 to a matrix of points whose positions are calculated from the centroid calculated in step 3;
5) determining the error in position of each monochrome mark as the difference between its position obtained in step 4 and a nominal position of the mark in relation to a theoretical nominal centroid of each pattern.

20. The method of claim 10, wherein the set of monochrome marks includes monochrome marks printed by all subsets of the nozzles of said printheads whose positions are to be measured.

21. A method of sensing directional aberrations among ink-jet nozzles of a plurality of printheads mounted on a scanning carriage, comprising:
printing an alignment pattern on a print medium, the alignment pattern comprising a first set of target patches each printed using a subset of the nozzles on each of said plurality of printheads, the target patches arranged in a spaced relation, and a second set of color patches printed using a subset of the nozzles from only one of said printheads, each of said color patches positioned in a nominal position with respect to a corresponding plurality of the target patches; and
optically scanning said alignment pattern to determine measurements of relative positions between the color patches and the corresponding plurality of target patches.

22. The method of claim 21, further comprising:

processing the measurements to determine directional aberrations between nozzles of the selected one of said printheads.

23. The method of claim 21 wherein said corresponding plurality of said target patches is arranged symmetrically about a corresponding one of the color patches.

24. The method of claim 23 wherein said corresponding plurality of said target patches includes four target patches arranged at 90 degree spacings about the corresponding one of the color patches.

25. The method of claim 21 wherein the plurality of printheads includes a black ink printhead, a cyan ink printhead, a magenta ink printhead and a yellow ink printhead.

26. The method of claim 21 wherein said target patches are printed by replicating a fundamental cell pattern consisting of single droplets of ink deposited by a nozzle of each printhead.

27. The method of claim 26 wherein said droplets of ink are deposited at respective nominally nonoverlapping positions in a cell grid.

28. The method of claim 21 wherein said step of optically scanning said alignment pattern includes scanning the pattern with an optical sensor having a field of view at the pattern, and the target patches and the color patches have a nominal dimension, and wherein said field of view is larger than the nominal dimension.

29. A method of sensing the location of marks printed on a print medium by ink-jet nozzles of a plurality of printheads mounted on a scanning carriage, comprising:

printing an alignment pattern on a print medium, the alignment pattern comprising a set of target marks, each target mark printed using a subset of the nozzles on each of said plurality of printheads, the target marks including an elongated first mark disposed in a scan direction of scanning movement of said scanning carriage, and an elongated second mark disposed in a media moving direction transverse to said scan direction, and a set of color patches printed using a subset of the nozzles from only one of said printheads; and optically scanning said alignment pattern to determine measurements of relative positions between the color patches.

30. The method of claim 29, wherein the color patches printed by nozzles of a particular printhead are printed in a color region dedicated to that printhead.

31. The method of claim 29, further comprising:

processing the measurements to determine directional aberrations between nozzles of the selected one of said printheads.

32. The method of claim 29 wherein the plurality of printheads includes a black ink printhead, a cyan ink printhead, a magenta ink printhead and a yellow ink printhead.

33. The method of claim 29 wherein said target marks are printed by replicating a fundamental cell pattern consisting of single droplets of ink deposited by a nozzle of each printhead.

34. The method of claim 29 wherein said step of optically scanning said alignment pattern includes scanning the pattern with an optical sensor having a field of view at the pattern, and the target patches and the color patches have a nominal dimension, and wherein said field of view is larger than the nominal dimension.

35. A method of sensing the location of marks printed on a print medium by ink-jet nozzles of a plurality of printheads mounted on a scanning carriage, comprising:

printing an alignment pattern on a print medium, the alignment pattern comprising a set of target marks printed using a subset of the nozzles on each of said plurality of printheads, the target marks including an elongated first mark disposed in a scan direction of scanning movement of said scanning carriage, and an elongated second mark disposed in a media moving direction transverse to said scan direction, and a set of color patches printed using a subset of the nozzles from only one of said printheads, wherein the color patches printed by nozzles of a particular printhead are printed in a color region dedicated to that printhead; and optically scanning said alignment pattern to determine measurements of relative positions between the color patches, including:
1) measuring the position of the first and second elongated bars and the positions of all the color patches;
2) calculating distances between the color patches and the respective first and second elongated marks, to provide a matrix of points, representing the position of all the color marks, referenced to the first and second elongated bars;
3) calculating the centroid of the points in the matrix;
4) converting the matrix of step 2 to a matrix of points whose positions are calculated from the centroid calculated in step 3;
5) determining the error in position of each color patch as the difference between its position obtained in step 4 and a nominal position of the patch in relation to a theoretical nominal centroid of each pattern.

36. A method for determining the location of the center of a mark printed on a print medium, comprising:

providing an optical sensor having a viewing area, the sensor producing an electrical sensor signal;

providing the medium having the mark printed thereon;

providing relative motion between the optical sensor and the medium during an optical sensing operation to scan the mark and produce a sensor signal indicative of the mark, wherein the sensor signal is represented by a guassian curve whose peak is at the center of the mark;

sampling the sensor signal to produce a vector of pairs of data representing the position and amplitude;

processing the vector with a linear fitting algorithm to determine the center of the mark.

37. The method of claim 36, wherein the vector pairs of data $(x_i, y_i)$ represent a position in a direction of relative movement and the signal amplitude measured by the sensor the step of processing the vector includes:

processing the vector $(x_i, y_i)$ to provide $a_i=(y_{i+1}-y_{i-1})/x_i$, to provide a linear relationship for the partial $\partial y/\partial x$ versus the position (x), with the zero in x=the center of the mark;

solving the linear relationship for $a_i=0$, to obtain a value for x, and setting said value as the center of the mark.

* * * * *